Aug. 3, 1954   J. W. GAUNTLETT ET AL   2,685,331
CHILD SAFETY DEVICE
Filed Nov. 26, 1951                                      2 Sheets-Sheet 1
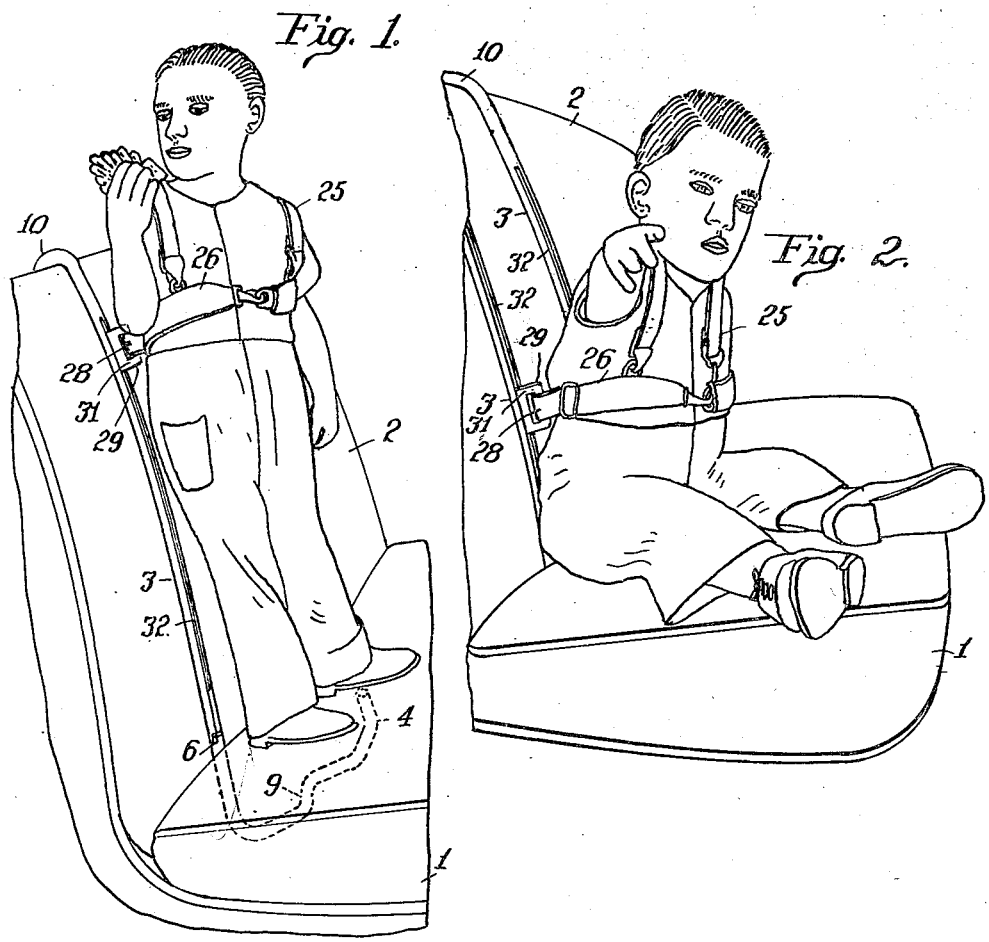
INVENTOR
Jane W. Gauntlett
and Don A. McNaughton
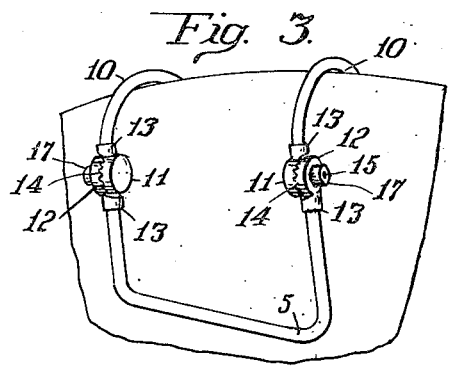
ATTORNEYS

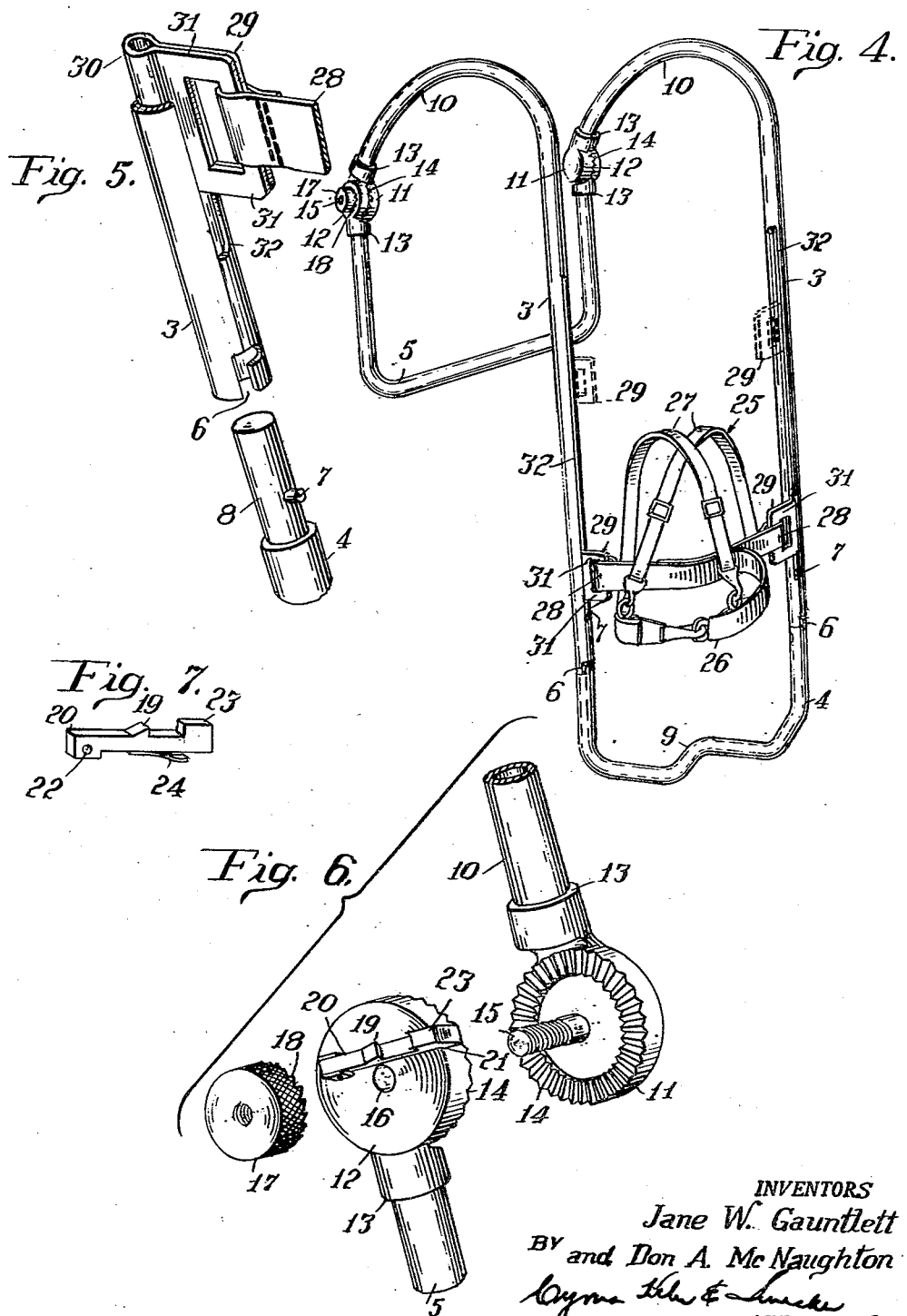

Patented Aug. 3, 1954

2,685,331

UNITED STATES PATENT OFFICE 2,685,331

CHILD SAFETY DEVICE

Jane W. Gauntlett, Gold Beach, Oreg., and
Don A. McNaughton, Knoxville, Tenn.

Application November 26, 1951, Serial No. 258,257

5 Claims. (Cl. 155—189)

This invention relates to improvements in child safety devices for use particularly for holding a child on the seat of an automobile or other vehicle in a sitting or standing position.

Many chairs have been provided heretofore for holding a child in place on an automobile seat, usually by means of auxiliary seats provided for attachment to the automobile seat. Such auxiliary seats are adequate to restrain the child, but children often become fretful and discontented when they are restrained in a sitting position and are much more content to move around, to stand up at intervals or to remain seated according to the whim of the child. Nevertheless, no satisfactory provision has been made heretofore for allowing such movement of the child without danger of injury thereto, especially due to the stopping of the vehicle, which otherwise would throw the child from the seat or against the windshield and result in serious injury thereto.

One object of this invention is to provide a safety device for restraining a child in a vehicle seat while allowing the maximum of movement of the child either to sitting or standing positions, with a minimum of restraint and yet serving to hold the child securely and safely on the vehicle seat.

A further object of the invention is to simplify and improve the construction of restraining devices for children with a relatively simple and inexpensive construction that may be applied to or removed from a vehicle seat without serious difficulty, and which is light in weight and easily collapsible or for carrying separate from the vehicle.

Still another object of the invention is to provide in a restraining device for a child for securely holding the child with respect thereto while allowing a maximum of movement up and down with respect to the device as a result of a change of position of the child from a standing to a sitting position, as may be desired.

These objects may be accomplished in a device provided with a frame structure capable of attachment to a motor vehicle seat for separation or removal therefrom when not in use. This frame may comprise side members which may be hooked over the top of the vehicle seat and held in place in any suitable manner thereon, or otherwise secured thereto. Suitable restraining means is adapted to be applied to the child and may comprise a harness, belt or other device that will hold the child effectively while allowing for freedom of movement to a limited extent with respect to the vehicle seat. This restraining device is adapted for bodily movement with respect to the frame and may have sliding action therewith for a change of position according to the position of the child on the vehicle seat. Suitable locking means is provided for holding the device in place with respect to the seat to ensure of maximum safety with a minimum of restraint.

This embodiment of the invention is illustrated in the accompanying drawings in which:

Fig. 1 is a perspective view of a portion of a vehicle seat, showing the restraining device in one position with respect to the frame;

Fig. 2 is a similar view showing the restraining device in a different position with respect thereto;

Fig. 3 is a perspective view of the back of the seat showing the holding of the frame thereon;

Fig. 4 is a detached perspective view of the child safety device;

Fig. 5 is a detailed perspective view of a portion of the frame thereof, with parts disconnected;

Fig. 6 is a perspective view of portions of the locking means shown disconnected in exploded relation, and Fig. 7 is a perspective view of a locking key, detached.

The invention is shown applied to a motor vehicle seat having the usual removable seat cushion generally designated at 1, with a separate back rest 2, the cushion 1 usually being separable and removable from the back rest 2. However, provision may be made for application of the invention to any suitable form of vehicle or other seat.

The safety device comprises a frame including a pair of upright side members 3, joined together at their lower ends by a foot portion 4 and at their upper ends by a yoke portion 5. This frame is adapted for attachment to the vehicle seat 1—2 to hold in place the child restraining device as hereinafter described.

Each of the upright side members 3 is shown in the form of a tubular section, the lower end of which is provided with a bayonet slot 6 in position to receive therein a pin 7 formed on a rod 8 that extends upwardly from each side of the foot portion 4. This provides a suitable detachable connection between each side member 3 and the foot portion 4, whereby the parts may be separated from each other by disengagement and readily assembled when desired.

The foot portion 4 is also formed preferably of tubular material, preferably somewhat flattened at the lower closed side thereof and turned outward, as indicated at 9 in Fig. 4, to form a lateral projection that will engage under the seat cushion 1 so as to anchor the lower end of the frame securely in place and to ensure that it will be held tightly in position between the back edge of the seat cushion 1 and the forward face of the back cushion 2. This outwardly turned or step portion 9 is desirable to ensure anchoring of the frame in place, but is not essential to the invention since the seat cushion 1 is often retained securely in place on the vehicle seat, in which event it will be sufficient for the foot portion 4 to extend down between parts 1 and 2 and to be retained thereby.

The upper ends of the frame side members 3 are shown as turned over in the form of crooks, as indicated at 10. This will enable the side members to hook over the upper edge of the seat cushion 2, substantially as indicated in Figs. 1, 2 and 3, and to extend down sufficiently beyond the upper edge of the seat cushion to anchor the frame thereto at the top. At the same time, the frame may be readily removed merely by lifting off this frame, thereby separating the crooks 10 from the seat cushion.

If additional anchorage is desired, this can be provided by the attachment of the yoke portion 5 to the turned over ends of the frame side members 3 and preferably also by locking the yoke portion 5 in secure relation to the seat cushion 2. This yoke portion 5 connects together the free upper ends of the frame members 3, thus cooperating with the foot portion 4 to form a unitary frame structure.

The detachable and locking connection is provided in the form of the invention illustrated between each of the crook portions 10 and the adjacent end of the yoke portion 5. One form of locking means that may be used for this purpose is illustrated in Fig. 6, which locking means serves both as a pivotal and as a locking connection between these parts.

Each hinge includes a pair of complementary plates 11 and 12, each of which has a socket 13 thereon to be fitted and secured in place on the respective tubular portions 5 and 10 of the frame parts to anchor these hinge plates 11 and 12 securely and rigidly to the respective frame sections. The hinge plates 11 and 12 are adapted to fit together in face to face relation, and the inner faces thereof are serrated at 14 to interengage in locking relation when the plates are fitted together directly abutting each other. A screw bolt 15 is fixed rigidly to the plate 11 and passes through an opening 16 in the plate 12, adapted to receive thereon a nut 17, threaded over the projecting end of the bolt 15 externally of the plate 12. Thus upon drawing up of the nut 17, the serrated portions 14 of the plates 11 and 12 will be drawn together in interfitting relation to hold the plates securely fixed in circumferential positions with respect to each other and against turning, which would allow loosening of the yoke portion 5 relative to the side members 3 of the frame.

If additional locking be desired for the nut 17, any suitable form of locking nut may be used for this purpose. However, it is also possible to use a special form of locking arrangement here shown. In this form the inner face of the nut 17 is serrated at 18, with projecting teeth adapted to be engaged by a tooth 19 formed on a key 20, pivotally mounted in a groove 21 in the adjacent face of the plate 12. The key 20 is pivoted at 22 at one end thereof while the opposite end has a raised shoulder 23 adapted for pressure engagement by the thumb of the operator. A spring 24 is interposed between the base of the key and the plate 12, normally urging the key outward into engagement with the teeth 18 of the nut 17, as shown more in detail in Fig. 7.

It will be evident that upon pressing inward on the thumb portion 23 of the key 20, the tooth 19 thereon is disengaged from the ratchet teeth 18 of the nut 17, allowing the latter to be turned in a counter-clockwise direction, as viewed in Fig. 6, to loosen the bolt 15. This loosening action in turn tends to release the interengagement of the teeth 14 between the plates 11 and 12, thereby allowing swinging movement of the yoke portion 5 relative to the frame side members 3. Then upon tightening of the nut 17 this yoke portion is locked securely in clamping engagement against the back cushion 2 of the seat, which in turn holds the frame securely in place on the vehicle seat.

A restraining device is adapted to be used for holding the child in place while permitting of some freedom of movement. In the form illustrated the restraining device comprises a harness generally designated at 25, including a belt portion 26 and shoulder portions 27, which extend respectively about the waist and over the shoulders of the child. Suitable fastenings are used to detachably connect these parts together and to hold the harness securely on the body of the child. Any suitable form of restraining device may be used, however, as desired.

The opposite sides of the belt portion 26 include tabs 28 that extend to and are connected with slide members 29 which are slidably connected with the respective side members 3 of the frame. As shown in Fig. 5, each of the slide members 29 is formed of sheet material such as spring metal, folded back upon itself with a tubular portion 30 telescopically connected with the respective tubular member 3 and terminating in D-flanges 31 that extend outward through slots 32 formed in the corresponding tubular member 3. As shown in Fig. 4, each of the slots 32 extends less than the entire length of the vertical portion of the side member 3, and may be closed at its lower end after insertion of the corresponding slide member 29 therein, thus limiting the upward and downward movement of the slide member with respect thereto. This forms a slidable connection of the restraining device 25 with the frame 3—5, so as to permit the child to move freely to a limited extent with respect to the seat of the vehicle, the slide members 29 moving along the slots 32 in the frame to permit of such freedom of movement of the child.

The frame may be applied to the vehicle seat in the manner illustrated in Figs. 1 to 3. This is accomplished by hooking the crook portions 10 of the frame over the upper edge of the back cushion 2 and confining the lower end portion of the frame between the seat and back cushions 1 and 2. Where the foot portion 9 is turned outward from the body of the frame, as shown in Fig. 4, the seat cushion 1 may be placed over the foot portion 9 as an additional anchor for the lower end of the frame. The yoke portion 5 can be turned out directly against the back of the back cushion 2, as shown in Fig. 3, and this will aid in securing the frame in place. The lock nuts 17 can be tightened to hold the yoke portion 5 securely against the seat and, if desired, the additional locking feature provided by the key 20 may be incorporated in the structure as a securing anchor for this yoke portion, holding the nuts 17 against loosening when the latter are tightened.

The child is confined by the restraining device 25 being attached thereto in obvious manner, preferably about the waist and over the shoulders, and held in place on the child by the detachable fastenings, such as the hooks shown. The child will be free to move about from a sitting to a standing position, or vice versa, as shown in Figs. 1 and 2, the slide members 29 moving up and down in the slots 32 to accommodate such raising and lowering movement of the child.

In this way the child has a substantial amount of freedom of movement and is not restrained continuously in one position. Nevertheless the child is held against danger of falling from the seat due to sudden motions of stopping or starting of the vehicle. This is a material improvement over most auxiliary seats provided heretofore and adds materially in comfort and quietness of the child during such transportation.

At the same time the device is relatively simple and inexpensive to manufacture and use. The parts may be detachably separated from each other for packing or storing in a confined space and may be readily assembled by very simple directions, thereby making it possible to sell the device at relatively low cost for assembly by the user.

While the invention has been illustrated and described in one embodiment, it is recognized that variations and changes may be made therein without departing from the invention, as specified in the claims.

We claim:

1. A child safety device comprising a frame adapted for connection with a vehicle seat having a back and including upright side members adapted to contact the back of the seat along a portion thereof, each of said side members being tubular and having a slot in a side of said portion thereof, a slide member slidably mounted in each tubular side member with a projecting ear portion extending through the slot, a restraining device including a harness having a belt portion with tabs at opposite sides thereof secured to the ears of the slide members and slidably connected thereby with the frame for up and down movement relative thereto.

2. A child safety device comprising a frame including upright side members having crook portions at the upper ends thereof adapted to be engaged over a vehicle seat, a restraining device connected with the side members, a yoke portion pivotally connected with each of the side members at the opposite side of the crook portions from said restraining device for pivotal motion about a horizontal axis, and means for locking the yoke portion in set position with respect to the frame side members.

3. A child safety device comprising a frame including upright side members having crook portions at the upper ends thereof adapted to be engaged over a vehicle seat, a restraining device connected with the side members, a yoke portion pivotally connected with each of the side members at the opposite side of the crook portion from said restraining device, and means for locking the yoke portion in set position with respect to the frame side members, said locking means including a pair of cooperating plates having interengaged teeth in facing sides thereof, a bolt securing the plates together, and means for holding the bolt in adjusted relation.

4. A child safety device comprising an upright frame adapted for connection with a vehicle seat having a seat cushion and a back and including upright side members spaced apart and adapted to contact the back of the seat along a portion thereof, each of said side members being tubular and having a slot in a side of said portion thereof, a slide member slidably mounted in each tubular side member with a portion projecting through the slot, a restraining device connected with the projecting portions of the slide members, and a foot member detachably connected with the lower end of each of said side members and including an out-turned portion disposed at an angle to the plane of said upright side members in position to be engaged under the seat cushion.

5. A child safety device comprising a frame adapted for connection with a vehicle seat and a child restraining device connected with said frame, said frame including a pair of upright side members each having a crook portion at the top thereof adapted to extend over the top of the seat and a bottom portion having a slot therein, said slot extending axially from the bottom end of said bottom portion and then transversely thereof, a foot member including end portions in telescoping relation with said bottom portions of said side members and an intermediate out-turned portion at an angle to the plane of said side members in position to be engaged under the seat cushion, projections on the end portions of said foot member cooperating with said slots in the bottom portions of the side members to detachably connect said foot member to said side members, a yoke member, and means for detachably connecting said yoke member to the upper ends of the side members in such a way as to prevent rotation of either side member about its vertical axis.

References Cited in the file of this patent

UNITED STATES PATENTS

| Number | Name | Date |
|---|---|---|
| 645,176 | Marsh | Mar. 13, 1900 |
| 1,194,259 | Wendelburg | Aug. 8, 1916 |
| 1,687,038 | Pettigrew | Oct. 9, 1928 |
| 2,008,689 | Donahoe | July 23, 1935 |
| 2,048,955 | Showalter | July 28, 1936 |
| 2,288,692 | Fearson | July 7, 1942 |
| 2,346,895 | Bergman | Apr. 18, 1944 |
| 2,349,109 | O'Keeffe | May 16, 1944 |
| 2,365,003 | Reinholz | Dec. 12, 1944 |
| 2,455,640 | Ashbaugh | Dec. 7, 1948 |
| 2,481,382 | Bennett | Sept. 6, 1949 |
| 2,624,394 | De Milto | Jan. 6, 1953 |